Patented Apr. 11, 1944

2,346,239

UNITED STATES PATENT OFFICE 2,346,239

PREPARATION OF CHOLIC ACID

Robert H. Sifferd, Hollywood, Ill., assignor to Armour and Company, Chicago, Ill., a corporation of Illinois No Drawing. Application June 11, 1941, Serial No. 397,643

7 Claims. (Cl. 260—397.1)

This invention relates to processes of obtaining cholic acid from bile and animal excretions.

Cholic acid is usually present in bile in the form of the sodium salts of the conjugated bile acids, taurocholic acid and glycocholic, although, in some cases, more or less free cholic acid exists. In these conjugated bile acids, cholic acid is combined with the indicated amino acid, either taurine or glycine, and it is liberated from the given combination by alkaline hydrolysis, as described in more detail later.

The acid has heretofore been liberated from its conjugated salt by alkaline hydrolysis of the salt or of material containing it. It has been customary, for example, to saponify bile and then to acidify the mixture to obtain a tarry mass. After standing for some time, the tar is washed and dried and then moistened with absolute alcohol to get a crystallized material which must be recrystallized from alcohol about four times. A week or longer is required for this process.

I have now discovered a cholic acid in a high state of purity can be precipitated from solutions thereof in organic solvents by the addition thereto of organic liquids which are miscible with said solution but in which cholic acid is not soluble. The addition of such organic liquids causes the cholic acid to precipitate.

My invention can be used for the recovery of cholic acid in several ways. For example, the cholic acid can be recovered from bile by acidifying aqueous saponified bile in the presence of a water-immiscible solvent for bile acids, separating the solvent containing the dissolved acids and then adding to the solution a liquid in which cholic acid is insoluble and with which all the other constituents of the solution are miscible, or in which they are all soluble. The cholic acid which precipitates is then recovered.

More specifically, bile is saponified with caustic soda, for example, and the saponified material acidified with an acid, such as hydrochloric, sulfuric or acetic acid. The acidified material may be extracted with an organic solvent for bile acids or, more conveniently, the acidification step takes place in the presence of such a solvent. The solution of bile acids is then recovered separately and there is added to it a liquid in which the cholic acid is insoluble but which is a good solvent for the other bile substances. The cholic acid precipitates and is recovered.

Example 40 gallons of bile are saponified with 40 lbs. of NaOH (commercial grade), either by refluxing at atmospheric pressure for 18 to 24 hours or by autoclaving at 15 lbs. pressure for about 12 to 16 hours. After saponification is completed, the mass is allowed to cool and there are added 3 gallons of amyl alcohol (technical grade, a mixture of amyl alcohol isomers). Enough hydrochloric acid is then added, with agitation, to bring the pH of the aqueous phase to about 3.0. The liquid mixture is then allowed to stand until the layers stratify, after which the lower aqueous layer is drawn off. To remaining alcohol solution is added two to four volumes of technical benzol, with agitation, to precipitate the cholic acid. The liquid is allowed to stand for from about 4 hours to a day or longer, as convenient, to permit crystallization to take place, after which the crystals are filtered off.

If desired, the cholic acid crystals are now further purified by dissolving in the smallest possible amount of amyl alcohol at a temperature below 90° C. There are again added two to four volumes of benzol to cause the cholic acid to crystallize out of solution. The cholic acid so recovered is then recrystallized from about five volumes of hot ethyl alcohol by the addition of an equal volume of water. The crystals are recovered by filtration, washed on the filter with aqueous ethyl alcohol and finally washed with water. There are obtained 75 grams of cholic acid from each gallon of bile.

Instead of being filtered off, as given in the example, the crystals may be recovered by centrifuging.

In place of amyl alcohol, any other liquid, water-immiscible aliphatic alcohol may be used. I may also use any liquid, aromatic hydrocarbon, such as toluene, xylene and the like, or monochlorbenzene, dichlorbenzene, liquid aliphatic hydrocarbons, or liquid chlorinated aliphatic hydrocarbons, and the like, instead of benzene for precipitating the cholic acid.

Alternatively the bile may be saponified in the usual way and then acidified to yield a tarry precipitate of bile acids. This tar mixture is then separated off and taken up in any alcohol, such as ethyl alcohol, methyl alcohol, amyl alcohol, and the like. The precipitating liquid, as described above is then added to the alcohol solution to give a precipitate of cholic acid, which is now recovered and purified in the usual way. Thus this process may be used as a method of recovering cholic acid from any mixture of bile acids in which it occurs. In this case water-miscible alcohols can be used since they are admixed with the tar mixture after separation thereof from the aqueous acid reaction products.

Having thus described my invention, what I claim is:

1. The process of recovering cholic acid from other substances associated therewith in the process of isolating cholic acid from bile which includes the steps of obtaining a solution of cholic acid in an organic solvent and adding thereto an organic liquid miscible with said solvent but in which cholic acid is insoluble whereby the cholic acid is precipitated.

2. The process of recovering cholic acid from bile which includes the steps of obtaining an aliphatic alcohol solution of the cholic acid, together with impurities associated therewith, and precipiptating the cholic acid from said solution by the addition thereto of a liquid miscible with the solution but in which cholic acid is insoluble.

3. The process of recovering cholic acid from bile which comprises saponifying the bile, acidifying the saponification product, forming a solution of cholic acid thus obtained in an organic solvent for bile acids, and precipitating cholic acid from said solution by the addition thereto of an organic liquid miscible with the solution but in which cholic acid is insoluble.

4. The process of recovering cholic acid from bile which comprises saponifying the bile, admixing the saponified bile with a water-immiscible organic solvent for bile acids, acidifying the mixture to liberate bile acids, separating the organic solution from the reaction mixture and adding to said solution an organic liquid miscible with said solution but in which cholic acid is insoluble to precipitate the cholic acid.

5. The process as in claim 4 wherein the saponification mixture is admixed with a water-immiscible aliphatic alcohol.

6. The process as in claim 4 wherein the saponification mixture is admixed with amyl alcohol.

7. The process of recovering cholic acid from a tarry mixture of bile acids which comprises dissolving the tarry mixture in an aliphatic alcohol and adding an organic liquid thereto which is miscible therewith but in which cholic acid is insoluble in order to precipitate cholic acid.

ROBERT H. SIFFERD.